Nov. 2, 1948.　　　　　O. C. BOOHER　　　　2,452,721
AUTOMATIC RECORD CHANGING APPARATUS

Filed July 30, 1940　　　　　　　　　　　4 Sheets-Sheet 1

INVENTOR
ORTIS C. BOOHER
BY
ATTORNEY

Nov. 2, 1948.    O. C. BOOHER    2,452,721
AUTOMATIC RECORD CHANGING APPARATUS
Filed July 30, 1940    4 Sheets-Sheet 2
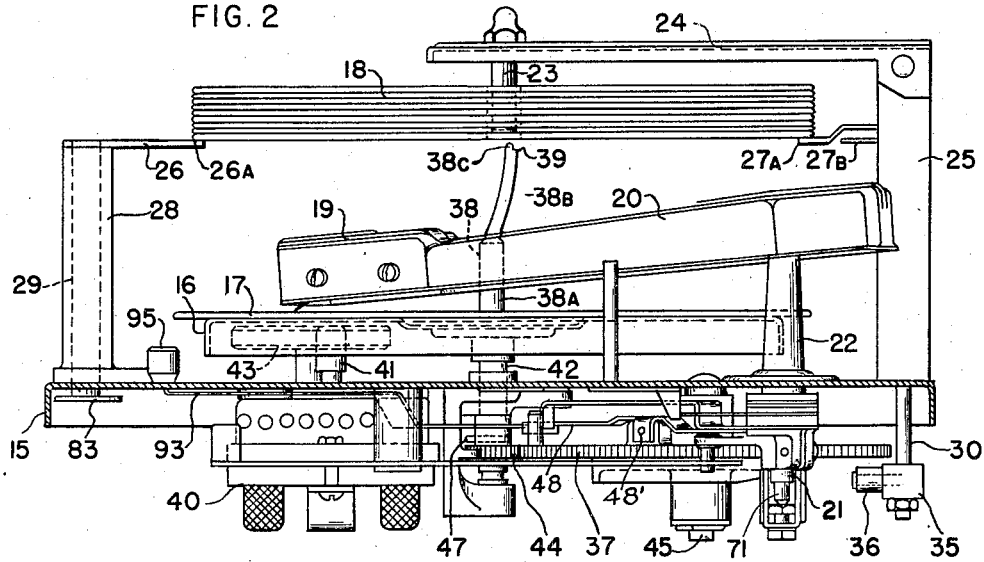
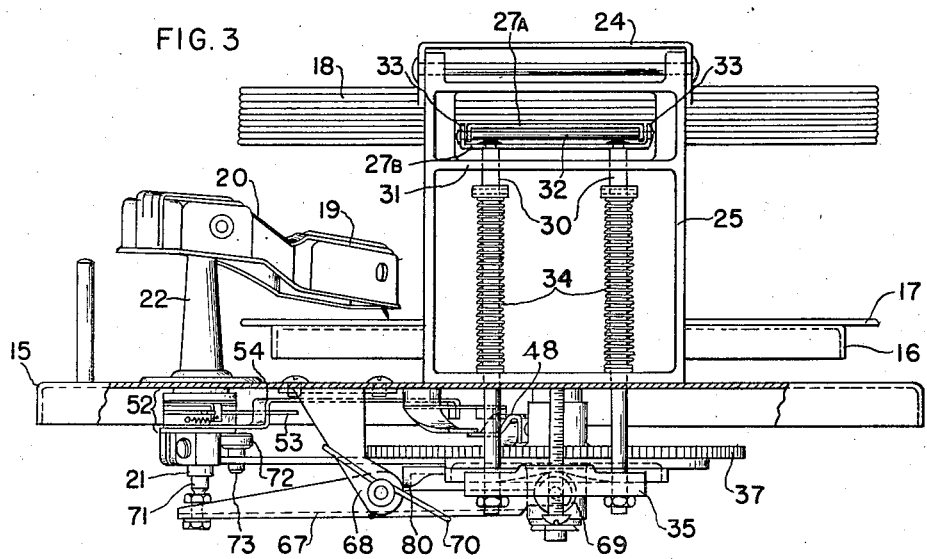
INVENTOR
ORTIS C. BOOHER
BY
ATTORNEY Nov. 2, 1948.   O. C. BOOHER   2,452,721
AUTOMATIC RECORD CHANGING APPARATUS Filed July 30, 1940   4 Sheets-Sheet 3

INVENTOR
ORTIS C. BOOHER
BY
ATTORNEY

Nov. 2, 1948.   O. C. BOOHER   2,452,721
AUTOMATIC RECORD CHANGING APPARATUS
Filed July 30, 1940   4 Sheets-Sheet 4

INVENTOR
ORTIS C. BOOHER
BY
ATTORNEY

Patented Nov. 2, 1948

2,452,721

UNITED STATES PATENT OFFICE 2,452,721

AUTOMATIC RECORD CHANGING APPARATUS

Ortis C. Booher, Fort Wayne, Ind., assignor, by mesne assignments, to Farnsworth Research Corporation, a corporation of Indiana Application July 30, 1940, Serial No. 348,575

11 Claims. (Cl. 274—10)

This invention relates to phonograph apparatus, and more particularly to record-changing mechanism incorporating an improved arrangement for initiating a record-changing cycle.

An object of the present invention is to provide an improved record-changing mechanism for initiating the record-changing cycle, said mechanism being of simplified construction and requiring a minimum of space in a phonograph cabinet.

In accordance with the present invention there is provided a record-changing apparatus which comprises a turntable, a pickup arm, a continuously driven shaft adapted to rotate with the turntable, and means responsive to the movement of a cam wheel for placing a record upon the turntable. The continuously driven shaft has a driving means with an extending member capable of driving the cam wheel. The cam wheel has a portion normally disconnected from the driving means and a portion adapted to be driven by the driving means. There is included also in the record-changing apparatus a means associated with the cam wheel which is actuated by the pickup arm for engaging the extending member to effect a connection between the driving means and the cam wheel to initiate one revolution of the cam wheel.

For a better understanding of the invention, together with other and further objects thereof, reference is made to the following description, taken in connection with the accompanying drawings, and its scope will be pointed out in the appended claims.

In the accompanying drawings:

Fig. 2 is a side elevation of the apparatus in Fig. 1 showing a group of records supported over the turntable and one record on the turntable in playing position as viewed from line 2—2 of Fig. 1;

Fig. 3 is a rear elevation of the apparatus in Fig. 1 showing the cam arrangement for raising and lowering the pickup arm and the mechanism associated with the shelves 27A and 27B;

Figure 1:
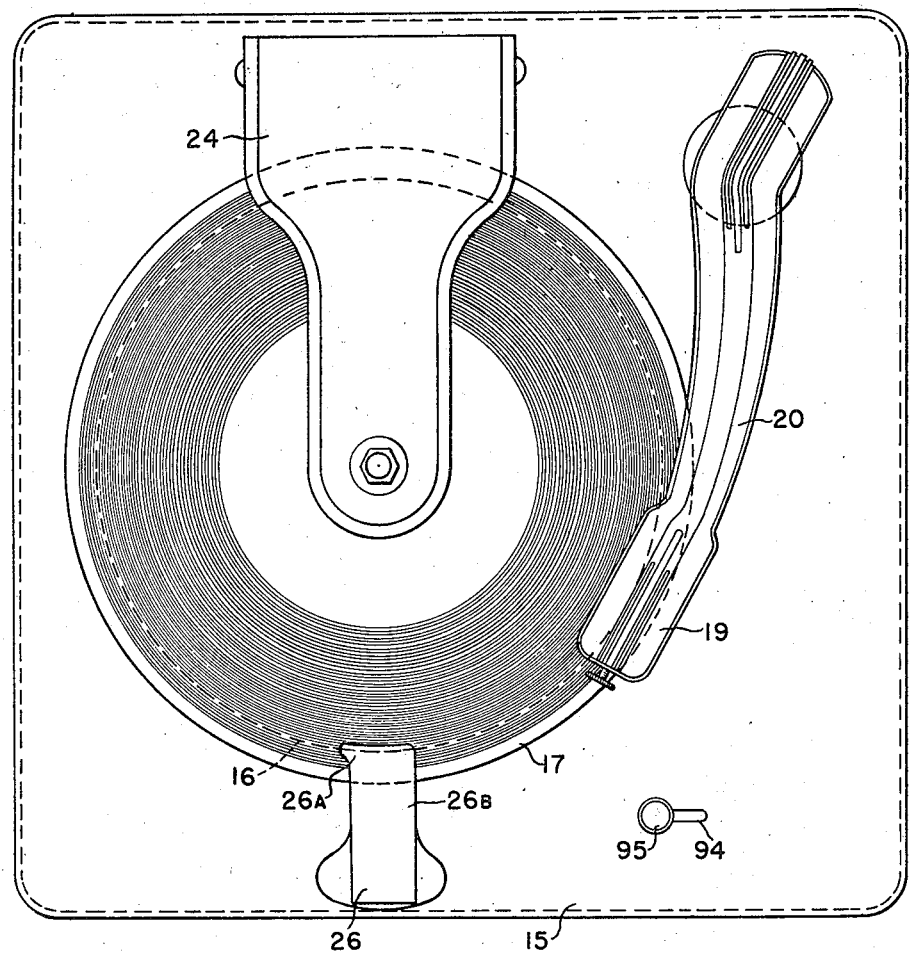
Fig. 1 is a top plan view of the apparatus with the unplayed record removed.

Referring now particularly to Fig. 1 of the drawings, the invention as illustrated is embodied in a record-changing mechanism including a base plate 15 supporting a horizontally rotatable turntable 16 capable of supporting one or more records 17 thereon. The top record carried by the turntable is in position to be played. The unplayed records 18 (Fig. 2) are supported in a stack above the turntable so that the lowermost record of said stack may be moved into playing position on the turntable. A reproducer 19 is supported at one end of a pickup arm 20, which is pivoted at its opposite end about the vertical axis of a shaft 21 (shown in Figs. 2 and 3) which is rotatable within a pedestal 22 to permit the reproducer and the pickup arm to move across the face of a record on the turntable as the needle of the reproducer follows the groove of said record.

The unplayed stack of records 18 is positioned above the turntable by a pin 23 carried by a plate 24 pivoted at its supported end upon a bracket 25 extending upwardly from the base plate 15.

The unplayed stack of records 18 positioned by the pin 23 is supported on shelves 26 and 27A or 27B which are associated with a bracket 28 and the bracket 25, respectively. When said stack of records is composed of ten-inch records, the records are supported by edge 26A of the shelf 26 and the shelf 27A. When the unplayed stack of records is composed of twelve-inch records, the records are supported by edge 26B of the shelf 26 and the shelf 27B. The edge 26B of the shelf 26 is shown in Fig. 1.

The shelf 26 is rotatably supported at the proper height upon a shaft 29. The shaft 29, being rotatably mounted in the bracket 28, may be turned to any desired 90° angle and locked in position as will be more fully described hereafter. When positioned to support ten-inch records, said shelf is locked in the position shown in Fig. 1. By rotating the shelf 26 90° in a counterclockwise direction from the position shown in Fig. 1, said shelf is adapted to support twelve-inch records.

The shelves 27A and 27B are adapted to support ten-inch records and twelve-inch records, respectively. The shelf 27B is supported directly upon uprights 30 (Fig. 3) which are slidably mounted and guided by a member 31 which may be an integral part of the bracket 25. The shelf 27A is pivotally supported on a rod 32 which is secured to a pair of ears 33 extending upwardly from the shelf 27B. The uprights 30 with the supporting shelves 27A and 27B carried thereby are normally mounted in uppermost position under tension of springs 34, in which position they support the unplayed records free of the record-releasing member or spindle to be described hereafter.

Figure 4:
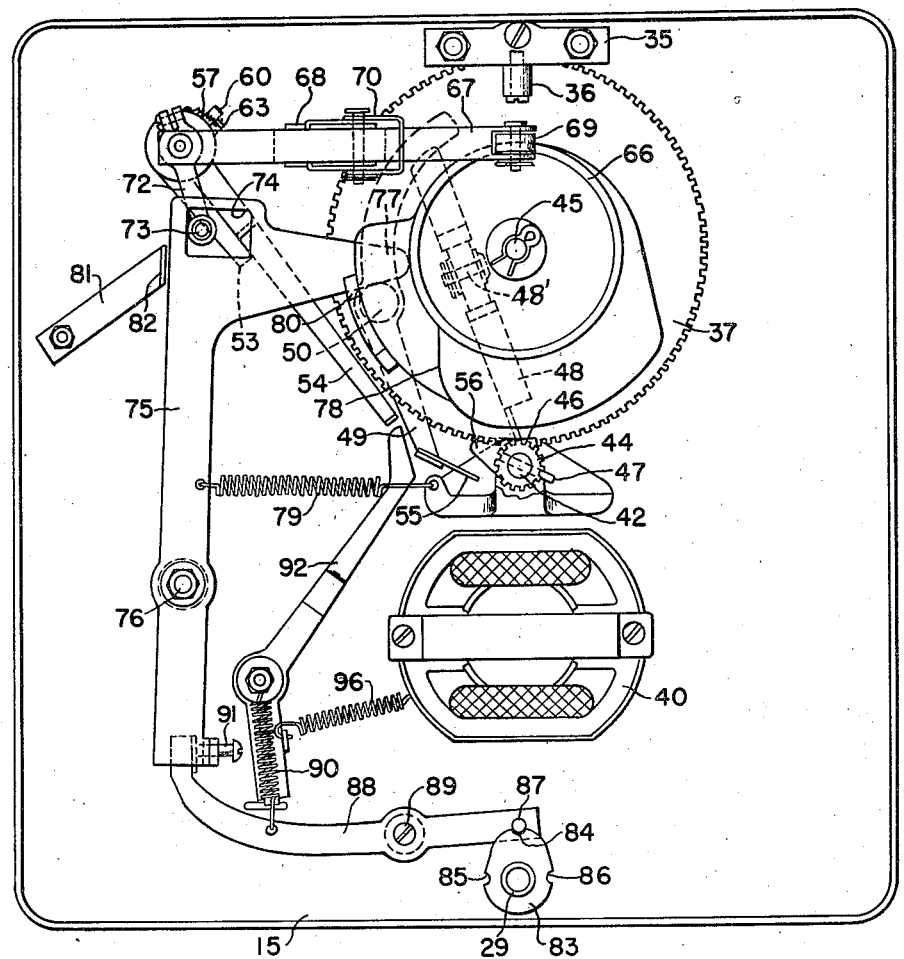
Fig. 4 is a bottom plan view of the underside of the apparatus.

The lower ends of the movable uprights 30, which extend through the base plate 15, are connected below said base plate by a bar 35 (Fig. 3) which is provided with a roller 36 (Fig. 4). Said roller is so positioned that it is capable of being engaged and actuated by the cam gear 37, as will be described hereafter, for lowering the bar 35 against the tension of springs 34 to lower the shelves 27A and 27B when the lowermost unplayed record is to be released.

A spindle 38 affixed to the turntable 16 to rotate therewith is horizontally displaced (Fig. 2) to the left of pin 23 and extends upwardly. The lower portion 38A of said spindle, which extends upwardly to the height to which the played records may accumulate upon the turntable, performs the function of centering records on the turntable. The spindle 38 is prolonged to form a laterally displaced portion 38B terminating in a reduced portion 38C which is formed by notching the upper end of said spindle. The notching of the spindle also forms a shoulder 39. The reduced portion 38C of the spindle lies immediately under the overhead pin 23 and is located eccentrically of the axis of said pin. The reduced portion 38C is spaced vertically from the pin 23 a distance less than the thickness of one record so that, when a record is moved from the supporting shelves, said record is certain of engaging said reduced portion. Thus the reduced portion 38C and the laterally displaced portion 38B of the spindle rotate with the turntable eccentrically of the axis of pin 23. Portion 38C follows a circular path, a portion of which is transverse of the centering aperture of the lowermost supported record.

Figure 5:
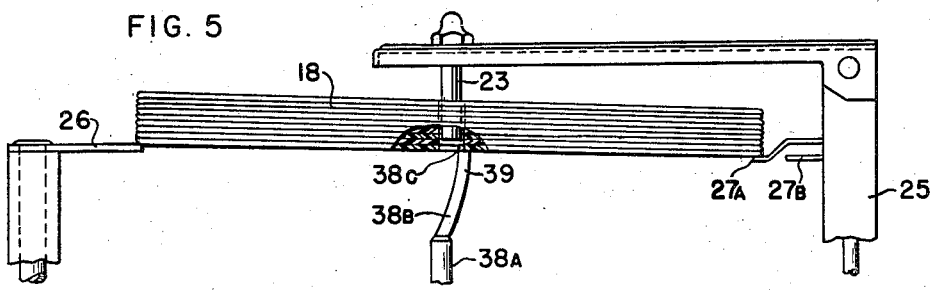
Figs. 5, 6, 7 and 8 are fragmentary views showing various positions of records in relation to the eccentric spindle at closely spaced intervals of time after the stack of unplayed records has been moved so that the lowermost record of said unplayed records engages the spindle.
Figure 6:
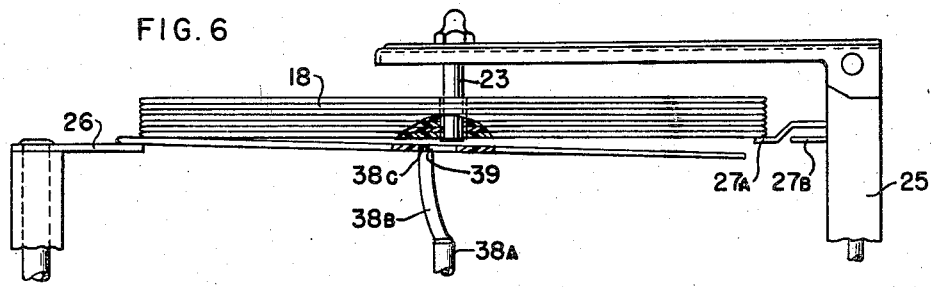
Figure 7:
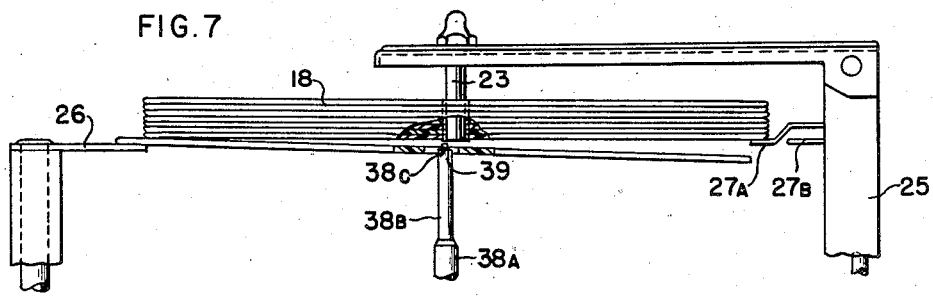
Figure 8:
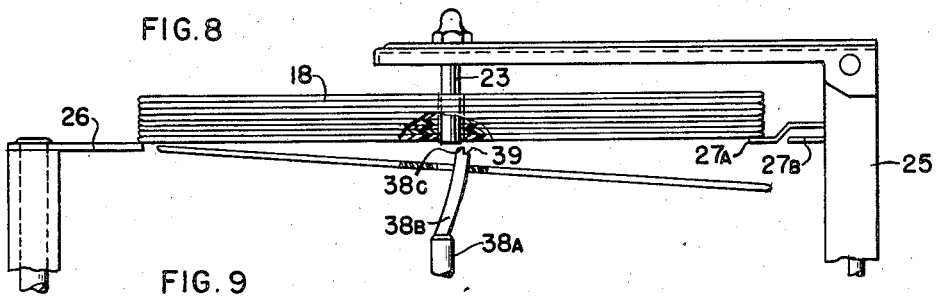

The unplayed records 18 normally are carried by their supporting shelves in a plane above the reduced portion 38C of the spindle so as not to be engaged by said reduced portion. But when, the shelves 27A and 27B are lowered by the movement of the roller 36, the lowermost record of the stack of unplayed records drops on the shoulder 39 of the spindle 38 to a position where the wall of the centering aperture of said lowermost unplayed record is engaged by the reduced portion 38C of said spindle, as shown in Fig. 5. The rotation of the spindle is so timed that, at the time of the lowering of the lowermost unplayed record into engagement with said spindle, the shoulder and the portion 38B of said spindle are nearest the right-supporting bracket, as shown in Fig. 5. The eccentric movement of the reduced portion 38C, while it is engaged with the wall of the centering aperture of said lowermost record, moves said lowermost record from the shelves 27A or 27B, as shown in Fig. 6. The height of the reduced portion 38C is such that not more than one record at a time will be moved to playing position on the turntable. Immediately after the lowermost unplayed record is moved off of shelves 27A or 27B these shelves are raised back to normal position. The continued movement of the spindle thereafter moves said lowermost unplayed record from the shoulder 39, and the wall of the centering aperture of said lowermost record engages the portion 38B of the spindle, as shown in Fig. 7. Continued movement of said spindle moves said lowermost unplayed record off of the left-hand supporting shelf 26, as shown in Fig. 8, and said lowermost record moves to the centering portion 38A of said spindle. This portion of said spindle centers the record into playing position on the turntable.

The mechanism for driving the record-changing apparatus includes an electric motor 40 which is provided with a shaft 41. Said shaft is operatively connected to rotate the turntable and shaft 42 by means of a friction wheel 43 shown by dotted lines under the left-hand flange of the turntable in Fig. 2. The shaft 42 has a direct driving connection with the spindle 38, and carries a pinion gear 44 adapted to mesh with the cam gear 37.

The cam gear 37, as shown in Fig. 4, is affixed to shaft 45 which extends downwardly from the underside of the base plate 15. Several teeth are removed from said cam gear at point 46 to form a mutilated portion, said mutilated portion serving the purpose of breaking the driving connection between the cam gear 37 and the pinion gear 44.

The shaft 42 is provided with a radially extending pin 47, preferably mounted immediately above the pinion gear 44, said pin being adapted to engage a pivoted lever 48, mounted at 48' on the cam gear 37, when said lever is pivoted into the path of said pin. During the playing of a record, the pivoted lever 48 is elevated out of the path of the extending pin 47 in the manner to be described hereafter.

The pivoted lever 48 has its opposite end engaged by a horizontally pivoted lever 49 which is affixed to the base plate 15 at 50 and which is actuated by a tripping mechanism, to be described hereafter, which in turn is actuated by the pickup arm 20. In moving toward the center of the record, the pickup arm 20 moves with the hollow shaft 21. Said hollow shaft has secured to it a clutch mechanism 52, the detailed construction of which will be described hereafter, which frictionally engages a lever 53.

Referring particularly to Fig. 3, the lever 53 is pivotally supported at one end for rotation about the shaft 21. Thus, as a record is being played and the pickup arm 20 moves toward the center of the record, the clutch mechanism moves the lever 53 in a counterclockwise direction, as shown in Fig. 4. The lever 53 engages the side of a lever 54 which also moves in a counterclockwise direction from the position shown in Fig. 4. The free end of the lever 54 is preferably turned downwardly at right angle and engages the lower end of the lever 49, which is pivotally mounted intermediate its end to the base plate 15.

Each time the cam gear 37 completes a revolution, the upper end of the pivotal lever 48, previously described, engages the upper end of the lever 49, which is so shaped that its engagement with the pivotal lever 48 causes the upper end of said pivotal lever to move downwardly toward the surface of the cam gear 37 and the lower end as shown in Fig. 4 of said pivotal lever to move upwardly out of the path of the pin 47.

As the pickup arm 20 approaches the inner groove of the top record on the turntable, it moves the levers 53, 54 and 49 in a counterclockwise direction (Fig. 4). The lower end of the lever 49 carries a leaf spring 55 which lies in the path of a cam 56 which is affixed to and rotates with the shaft 42. The cam 56 periodically strikes the spring 55 and moves the lever 49, and with it the levers 53 and 54, in a clockwise direction (Fig. 4), the lever 53 changing its position with respect to the pickup arm by virtue of the clutch mechanism.

When the needle at the end of the pickup arm 20 moves into the inner groove of the record that is being played, the lever 49 is moved by the cam 56 in a clockwise direction (Fig. 4) only against the biasing action of a clutch spring 57, as will presently be shown in greater detail when the construction of the clutch is described. When this occurs, the cam 56 may temporarily move the levers 53, 54 and 49 clockwise (Fig. 4), but these levers are immediately thereafter returned in a counterclockwise direction (Fig. 4) by the action of the spring 57. The return movement is sufficiently great so that the lever 49 is moved out of engagement with the lever 48. Said lever 48 thereupon moves in a vertical plane to position the lower end thereof, as shown in Fig. 4, downwardly in the path of the pin 47. As said pin rotates, it engages the pivoted lever 48 and moves the said lever in a horizontal plane whereby the cam gear 37 is rotated sufficiently far so that the teeth of said cam gear mesh with the teeth of the pinion gear 44, after which the pinion gear continues to drive said cam gear through a complete revolution to effect a record-changing cycle.

Figure 9:
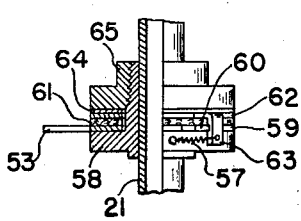
Fig. 9 is a view of a friction clutch assembly used in the apparatus.

The detailed construction of the clutch mechanism 52 previously referred to will now be described in greater detail. Referring particularly to Fig. 9 of the drawings, a flanged sleeve 58 is affixed to the hollow shaft 21 which also supports the pickup arm 20. Plate 59, to which are fixed the lever 53 and an ear 60, is mounted in a frictional relationship with the flanged portion of the sleeve 58. A suitable fiber washer 61 is slipped over the plate 59. A plate 62 with a turned-down ear 63 is placed over the fiber washer 61. A washer 64, preferably with a spring characteristic, is placed over the plate 62. A flanged cover member 65 is screwed on the sleeve 58 sufficiently far so that the bottom of the flanged portion of the cover member 65 rests upon the spring washer 64. The spring washer 64 maintains an even frictional engagement between the plate 62 and the fiber washer 61 when the cover member 65 and the sleeve 58 are screwed together. The clutch spring 57 is connected to the outer flange of the flanged sleeve 58 and the turned-down ear 63 of the plate 62. The turned-down ear 63 and the ear 60 are in such relationship that when the pickup arm 20 reaches the inner groove of the record, the movement of the levers 53, 54 and 49 is reversed by the cam 56, and the ears 63 and 60 are moved in a clockwise direction (Fig. 4) against the tension of the clutch spring 57. When the cam 56 moves out of relationship with the lever 49, the tension of the clutch spring 57 moves the levers 53, 54 and 49 with enough force to release the upper end of the lever 49 from engagement with the lever 48, thus initiating the rotation of the cam gear 37.

From the above, it will be noted that the cam gear 37 will be driven one revolution upon the actuation of the tripping mechanism and, upon completion of a single revolution, said cam gear will come to rest. The cam surfaces on the cam gear 37 act first to raise the pickup arm 20 to lift the needle in the reproducer 19 from the record, then to swing the pickup arm 20 in a horizontal plane beyond the peripheral edge of the records on the turntable 16, and then to move the lowermost unplayed record from the supporting shelves 26 and 27A or 27B to cause said lowermost record to become engaged by the reduced portion 38C for moving said lowermost supported record into playing position on the turntable. Thereupon, the pickup arm is returned to the initial groove of the dropped record and is lowered thereon. The cam gear then comes to rest to permit the playing of the record in the usual way until the pickup arm reaches the inner groove of the record where it will cause the tripping mechanism to be initiated to start the cam gear on another revolution.

The first action caused by the cam surfaces on the cam gear 37 when it starts to rotate is effected by a cam surface 66 (Fig. 4). An arm 67 is pivotally mounted intermediate its ends by means of a bracket 68 to the underside of the base plate 15. Said arm carries at one end a roller 69 which is biased by a spring 70 into engagement with the cam surface 66. As the roller 69 follows the cam surface 66, it moves the left-hand end of the arm 67 upward. This movement in turn raises a pin 71 (Fig. 3) vertically in the hollow shaft 21. The upper end of the pin engages the underside of the pickup arm to raise same.

The next movement is to swing the pickup arm 20 free of a record on the turntable. For this purpose there is provided a lever 72 (Figs. 3 and 4) which is affixed to the lower end of the hollow shaft 21, and at the opposite end of which is fixed a pin 73. A horizontal movement of the lever 72 effects a corresponding movement to said pickup arm and vice versa. The pin 73 at one end of the lever 72 moves within an aperture 74 located in the heel of an L-shaped lever 75 (Fig. 4) which is pivotally mounted at 76 to the underside of the base plate 15. The aperture 74 is sufficiently large so that the lever 72 with the pin 73 may move freely over a wide arc corresponding to the movement of the pickup arm while playing a record. A toe 77 of said L-shaped lever engages a cam surface 78 provided on the cam gear 37. Said toe is continuously biased toward the cam surface 78 by a spring 79. After the pickup arm has been raised from the surface of the record in the manner previously described, and as the cam gear continues to rotate, the cam surface 78 moves the L-shaped lever 75 in a counterclockwise direction (Fig. 4) about its axis and causes the right-hand side of the aperture 74 to engage and drive before it the pin 73, said pin moving the lever 72 and therewith the pickup arm in a radial direction away from the center of the record. The cam surface 78 is so shaped that the L-shaped lever 75 ceases its counterclockwise rotation at a time when the pickup arm has been moved beyond the edge of the record on the turntable.

After the pickup arm 20 thus has been swung clear of the played record, another record is moved into position on top of the turntable or the previously played record. As described above, the lowermost unplayed record is moved by lowering the plates 27A or 27B until said record is engaged by the reduced portion 38C of spindle 38. This movement is effected by the engagement of a cam surface 80 (Fig. 4) with the roller 36 affixed to the bar 35. Immediately thereafter the cam surface 80 moves out of engagement with the roller 36, permitting the springs 34 to return the supporting plates 27A and 27B to their normal positions so that the remaining unplayed records will be supported free of the reduced portion 38C.

The cam gear has by this time rotated sufficiently far so that the cam surface 78 allows the L-shaped lever 75 to move clockwise (Fig. 4) under the biasing action of the spring 79, to return the pickup arm to a position where the needle is over the starting groove of the record placed upon the turntable.

At this time, the cam surface 66 has rotated to the point where the arm 67 permits the pin 71 to move vertically downward, thus allowing the needle of the reproducer to be lowered into engagement with the record just placed on the turntable. Immediately thereafter the cam gear comes to rest in the position shown in Fig. 4 of the drawings, and the playing of the record recently placed upon the turntable takes place.

As appears in Fig. 4, a fixed stop 81 is secured to the base plate 15, with an upturned end 82 positioned in the path of the movement of the lever 53. As the pickup arm is swung beyond the edge of the turntable and the records thereon during a record-changing cycle, it moves the lever 53 in a clockwise direction (Fig. 4) into engagement with the stop 81. The engagement between the lever 53 and the stop 81 is effected, however, before the pickup arm has swung to its outermost position. The lever 53 changes its angular position relative to the pickup arm 20 through the slipping connection of the clutch mechanism previously described. This positions the lever 53 well forward of the pickup arm 20 and as said pickup arm is returned toward the inner groove of the record, it insures positive engagement of the levers 53, 54 and 49 prior to the time when the needle of the reproducer reaches said inner groove.

As shown in Figs. 2 and 4, the shelf 26, which is fixed to the upper end of the shaft 29 and is supported by the bracket 28, is locked in a selected position by the provision of a locking cam 83 secured to the lower end of the shaft 29. The cam is provided with notches 84, 85 and 86 which are engaged by a pin 87 fixedly secured to the right-hand end of a lever 88. Said lever is pivotally connected intermediate its ends at 89 to the base plate 15. A spring 90, which is affixed to the left-hand end of the lever 88, normally biases the pin 87 into continuous engagement with one of the notches 84, 85 or 86. When notch 84 engages the pin 87, the shelf 26 is locked in position to support ten-inch records. When the notch 85 engages the pin 87, the shelf 26 is locked in position to support twelve-inch records, and when the notch 86 engages the pin 87, the shelf 26 is locked in non-supporting position, thus allowing the easy removal of the played record from the turntable.

The left-hand end of lever 88 extends into engagement with the L-shaped lever 75 and a set screw 91 which is provided near the lower end of said L-shaped lever. The contour of the cam 83 is such that the left-hand end of the lever 88 allows less clockwise movement (Fig. 4) of the L-shaped lever 75 under the biasing action of the spring 79 when the apparatus is set to operate on twelve-inch records than on ten-inch records. This limited angular movement of the L-shaped lever 75 insures that the pickup arm is returned properly to the initial groove of the record about to be played. Thus, it is evident that the manual positioning of the shelf 26 for supporting either a stack of ten-inch or twelve-inch records automatically sets the mechanism for positioning the pickup arm in the proper position to engage the initial groove of the size of record that is to be played.

In addition to the ordinary tripping mechanism previously described, there is also provided a manual trip lever 92 (Fig. 4) pivotally mounted on the underside of the base plate 15. The lower end 93 of the lever 92 is bent to extend upwardly through a slotted aperture 94 (Fig. 1) in the base plate 15. To this bent end 93 of the lever 92 is affixed a knob 95 (Figs. 1 and 2). The lever 92 is normally biased by a spring 96 out of engagement with the turned-down lower end of the lever 49, but the lever 92 may be pivoted manually to engage the lower end of lever 49, thereby moving the upper end of the lever 49 out of engagement with the lever 48 manually to trip the mechanism and initiate a record-changing cycle.

The general mode of operation will now be described. After a stack of records has been placed upon the shelves 26 and 27A or 27B associated with the brackets 25 and 28 and a record has been placed in playing position upon the turntable 16, the pickup arm 20 is manually moved to place the needle of the reproducer 19 in the initial groove of the record on the turntable.

The pickup arm moves inwardly as the needle of the reproducer follows the spiral groove of the record and eventually reaches the inner groove where the automatic tripping mechanism is actuated by the movement of the levers 53, 54 and 49 (Fig. 4) responsive to the movement of the pickup arm, whereby the levers 49 and 48 disengage and the lever 48 moves in a vertical plane into the path of the pin 47 provided on the shaft 42.

Engagement of the pin 47 with the lever 48 causes the cam gear 37 to be rotated until the teeth of said cam gear mesh with the teeth of the pinion gear 44, after which the cam gear 37 is driven by the pinion gear 44 through a record-changing cycle.

As the cam gear 37 rotates, the cam surface 66 (Fig. 4) moves the arm 67 and raises the pickup arm off of the played record.

Continued movement of the cam gear causes the cam surface 78 (Fig. 4) to move the L-shaped lever 75, and therewith the lever 72, to swing the pickup arm beyond the edge of the played record on the turntable.

Shortly thereafter, the cam surface 80 (Fig. 4) engages the roller 36 which forces the bar 35 downwardly, thus lowering the shelves 27A and 27B so that the lowermost supported record is moved on the shoulder 39 of the spindle 38. The rotation of the spindle 38 moves said lowermost record from shelves 27A or 27B. Immediately thereafter the springs 34 raise the shelves 27A or 27B to their normal position, thereby raising the rest of the stack of unplayed records out of engagement with said spindle. The record on the shoulder 39 of said spindle is thereafter moved by the rotation of the spindle to playing position on the turntable.

The cam gear 37 has by this time rotated sufficiently far so that the cam surface 78 (Fig. 4) allows the L-shaped lever 75 to move clockwise (Fig. 4) under the biasing action of the spring 79 to return the pickup arm to a position where the needle is over the starting groove of the record placed upon the turntable.

At this time, the cam surface 66 (Fig. 4) has rotated to the point where the arm 67 permits the needle of the reproducer to be lowered into engagement with the record just placed on the turntable. Immediately thereafter the cam gear 37 comes to rest in the position shown in Fig. 4 of the drawings and the playing of the record recently placed upon the turntable takes place.

The next and following cycles of the automatic operations are initiated by the automatic tripping mechanism each time the needle in the reproducer moves into the inner groove of the record being played.

While there has been described what is at present considered the preferred embodiment of the invention, it will be obvious to those skilled in the art that various changes and modifications may be made therein without departing from the in-

What is claimed is:

1. In an automatic phonograph having a pickup arm, a continuously moving member including a projection and a cam, a cam wheel adapted to be driven by said continuously moving member, said cam wheel having a gap in its periphery for disengaging said cam wheel from said continuously moving member, a projection associated with and rotatable with said continuously moving member, a coupling member operatively associated with said cam wheel for moving in a vertical plane and being positioned normally in the path of said projection for being moved thereby for bringing said cam wheel into driving relationship with said continuously moving member, a catch operatively associated with said coupling member and said cam for holding said coupling member out of the path of said projection, and means for moving said catch to release said coupling member comprising a lever frictionally connected to said pickup arm and movable into engagement with said catch.

2. In an automatic phonograph having a pickup arm, a movable cam means, peripheral driving means on said cam means, said peripheral driving means having a gap, a continuously driven member adapted to be operatively associated with said peripheral driving means except when opposite said gap for driving said cam means, a projection rotatable with said driving member, a coupling member movably connected to said cam means for moving in a vertical plane and normally being positioned to be moved by said continuously driven member for bringing said peripheral driving means into driving relationship with said driven member, a catch operatively associated with said coupling member and said projection for holding said coupling member out of its normal position, and means comprising a lever connected to said pickup arm and movable into engagement with said catch for moving said catch to release said coupling member to its normal position.

3. In an automatic phonograph having a turntable and a movable pickup arm for cooperating with a record on the turntable, a movable cam means, peripheral driving means on said cam means, said peripheral driving means having a gap, a continuously driven member adapted to be operatively associated with said peripheral driving means except when opposite said gap for driving said cam means, a projection rotatable with said continuously driven member, a coupling member movably connected with said cam means for moving in a vertical plane and normally being in the path of said projection to be engaged thereby for moving said peripheral driving means into driving relationship with said driving member, a catch for holding said coupling member out of the path of said projection during the playing of a record, and means comprising a lever operatively associated with said catch and the pickup arm for causing said catch to release said coupling member when the pickup arm enters the tripping groove of a record on the turntable.

4. In an automatic phonograph having a pickup arm, a power driven shaft, a pinion driven by said shaft, a cam gear positioned relative to said pinion for meshing engagement therewith, said cam gear having a portion of its periphery removed for causing disengagement thereof with said member when said portion is presented thereto, a radially extending projection rotatable with said shaft, a coupling member mounted on said cam gear for moving in a vertical plane and normally being in the path of said projection for being moved thereby to move said cam gear into driving relationship with said pinion, a latch for holding said coupling member out of the path of said projection, and a lever operatively associated with said pickup arm and said latch for actuating said latch after the reproduction of a record by the phonograph.

5. In an automatic phonograph having a movable record-changing mechanism, a movable pickup arm and a driving mechanism for driving the record changer and moving the pickup arm, mechanism to initiate the operation of the driving mechanism comprising a rotatable cam carrier operatively associated with the mechanism for driving the record changer and moving the pickup arm, peripheral driving means on the periphery of said cam carrier, a gap in the periphery of said cam carrier peripheral driving means, a driving member operatively associated with said cam carrier peripheral driving means to drive said cam carrier except when opposite said gap, a projection operatively associated with said driving member and a movable coupling member operatively associated with said cam carrier, said projection and said coupling member being out of engagement with each other while the record is being reproduced but being engageable with each other momentarily to initiate the rotation of said cam carrier to cause said driving member to engage said peripheral driving means on said cam carrier, and means comprising a mechanical linkage operatively associated with said pickup arm and said coupling member for permitting said coupling member to move into the path of said projection to be moved thereby for initiating a cycle of rotation of said cam carrier and thereby to drive the record changing mechanism and move the pickup arm.

6. In an automatic phonograph having a turntable and a pivotally mounted pickup arm for cooperating with a record on the turntable, a continuously rotating shaft, cam means in driving relationship with said continuously rotating shaft, a projection rotatable with said continuously rotating shaft, a coupling member operatively associated with said cam means and movable in a plane substantially parallel to the axis of said shaft into operative relationship with said cam means and said projection for bringing said cam means into driving engagement with said shaft, and means comprising a mechanical linkage operatively associated with said pickup arm and said coupling member and responsive to the movement of the pickup arm upon its arrival at the tripping groove of a record on the turntable for initiating the movement of said coupling member.

7. In an automatic phonograph having a turntable and a movable pickup arm for cooperating with the record on the turntable, a movable change-cycle control means movable in a first plane, toothed driving means on said change-cycle control means, said toothed driving means having a gap, a continuously driven member adapted to be operatively associated with said toothed driving means except when said gap is opposite thereto for driving said change-cycle control means, a projection rotatable with said continuously driven member, a coupling member movably connected with said change-cycle control means for moving about an axis in a plane angularly displaced with respect to said first plane and normally being in the path of said projection to be engaged thereby for moving said toothed driving means into driving relationship with said driven member, means operatively associated with said coupling member for holding it out of the path of said projection during the playing of a record, a member operatively associated with said holding means and movable into the path of rotation of said projection for moving said holding means into engagement with said coupling member, and a connection between said pickup arm and said holding means for moving said holding means out of engagement with said coupling member.

8. In an automatic phonograph having a turntable and a movable pickup arm for cooperating with the record on the turntable, a movable change-cycle control means movable in a plane, toothed driving means on said change-cycle control means, said toothed driving means having a gap, a continuously driven member adapted to be operatively associated with said toothed driving means except when said gap is opposite thereto for driving said change-cycle control means, a projection rotatable with said continuously driven member, a coupling member movably connected with said change-cycle control means for moving about an axis perpendicular to said plane and normally being in the path of said projection to be engaged thereby for moving said toothed driving means into driving relationship with said driven member, a catch operatively associated with said coupling member for holding it out of the path of said projection during the playing of a record, a member operatively associated with said catch and movable into the path of rotation of said projection for moving said catch into engagement with said coupling member, and a connection between said pickup arm and said catch for moving said catch out of engagement with said coupling member.

9. In an automatic phonograph having a turntable and a movable pickup arm for cooperating with the record on the turntable, a change-cycle control means movable in a plane, toothed driving means on said change-cycle control means, said toothed driving means having a gap, a continuously driven member adapted to be operatively associated with said toothed driving means except when said gap is opposite thereto for driving said change-cycle control means, a projection rotatable with said continuously driven member, a coupling member movably connected with said change-cycle control means for moving about an axis perpendicular to said plane and normally being in the path of said projection to be engaged thereby for moving said toothed driving means into driving relationship with said driven member, a catch operatively associated with said coupling member for holding it out of the path of said projection during the playing of a record, a member operatively associated with said catch and movable into the path of rotation of said projection for moving said catch into engagement with said coupling member, and a linkage coupled to said pickup arm and movable therewith into engagement with said member for moving said catch out of engagement with said coupling member.

10. In an automatic phonograph having a turntable and a movable pickup arm for cooperating with the record on the turntable, a change-cycle control means movable in one plane, toothed driving means on said change-cycle control means, said toothed driving means having a gap, a continuously driven member adapted to be operatively associated with said toothed driving means except when said gap is opposite thereto for driving said change-cycle control means, a projection rotatable with said continuously driven member, a coupling member movably connected with said change-cycle control means for moving in a plane different from said one plane and normally being in the path of said projection to be engaged thereby for moving said toothed driving means into driving relationship with said driven member, a catch engaging and holding said coupling member out of the path of said projection during the playing of a record, said catch including a member movable into the path of rotation of said projection for moving said catch into engagement with said coupling member, and a linkage coupled to said pickup arm and movable therewith into engagement with said movable member for moving said catch out of engagement with said coupling member.

11. In an automatic phonograph having a turntable and a movable pickup arm for cooperating with the record on the turntable, a movable change-cycle control means, toothed driving means on said change-cycle control means, said toothed driving means having a gap, a continuously driven member adapted to be operatively associated with said toothed driving means except when said gap is opposite thereto for driving said change-cycle control means, a projection rotatable with said continuously driven member, a coupling member movably connected with said change-cycle control means for moving about a horizontal axis and normally being in the path of said projection to be engaged thereby for moving said toothed driving means into driving relationship with said driven member, a catch engaging and holding said coupling member out of the path of said projection during the playing of a record, said catch including a member movable into the path of rotation of said projection for moving said catch into engagement with said coupling member, and an arm coupled to said pickup arm and movable therewith into engagement with said movable member for moving said catch out of engagement with said coupling member.

ORTIS C. BOOHER.

REFERENCES CITED

The following references are of record in the file of this patent:

UNITED STATES PATENTS

| Number | Name | Date |
|---|---|---|
| 1,926,580 | Clark | Sept. 12, 1933 |
| 2,230,106 | Erwood | Jan. 28, 1941 |
| 2,371,361 | Small | Mar. 13, 1945 |
| 2,371,362 | Small | Mar. 13, 1945 |

FOREIGN PATENTS

| Number | Country | Date |
|---|---|---|
| 172,136 | Great Britain | Dec. 7, 1921 |